United States Patent
Westover

(10) Patent No.: US 10,144,427 B2
(45) Date of Patent: Dec. 4, 2018

(54) LEARNING DRIVER RATE OF PEDAL CHANGE

(71) Applicant: Toyota Motor Engineering & Manufacturing North America, Inc., Erlanger, KY (US)

(72) Inventor: Nathan C. Westover, New Hudson, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 23 days.

(21) Appl. No.: 15/452,610

(22) Filed: Mar. 7, 2017

(65) Prior Publication Data
US 2018/0257655 A1    Sep. 13, 2018

(51) Int. Cl.
*B60W 30/18*    (2012.01)
*B60T 7/04*    (2006.01)
*B60K 26/02*    (2006.01)
*B60T 7/12*    (2006.01)
*B60W 40/09*    (2012.01)
(Continued)

(52) U.S. Cl.
CPC ..... *B60W 30/18109* (2013.01); *B60K 26/021* (2013.01); *B60T 7/042* (2013.01); *B60T 7/12* (2013.01); *B60W 10/06* (2013.01); *B60W 10/18* (2013.01); *B60W 40/09* (2013.01); *B60T 2210/30* (2013.01); *B60T 2220/02* (2013.01); *B60T 2220/04* (2013.01); *B60T 2220/06* (2013.01); *B60T 2260/09* (2013.01); *B60W 2040/0809* (2013.01); *B60W 2540/106* (2013.01); *B60W 2540/12* (2013.01); *B60W 2540/28* (2013.01); *B60W 2550/12* (2013.01); *B60W 2550/142* (2013.01); *B60W 2550/20* (2013.01)

(58) Field of Classification Search
CPC ........... B60W 30/18109; B60W 10/06; B60W 10/18; B60W 40/09; B60W 2040/0809; B60K 26/021; B60T 7/042; B60T 7/12; B60T 2210/30; B60T 2220/02; B60T 2220/04
USPC .............................................. 701/48, 70, 71
See application file for complete search history.

(56) References Cited

U.S. PATENT DOCUMENTS 5,532,929 A    7/1996  Hattori et al.
6,141,615 A    10/2000 Saito et al.
(Continued)

FOREIGN PATENT DOCUMENTS

CN    103552469    2/2014

*Primary Examiner* — Gertrude Arthur Jeanglaude
(74) *Attorney, Agent, or Firm* — Snell & Wilmer LLP

(57) ABSTRACT

Methods, systems, and apparatus for predicting the braking or acceleration of a vehicle. The pedal change prediction system includes a braking sensor for providing braking data or an acceleration sensor pedal for providing acceleration data. The pedal change prediction system includes an electronic control unit that is configured to determine a rate of depression of the brake pedal or the acceleration pedal that is associated with a first braking force or a first acceleration force. The electronic control unit is configured to predict a triggering event that is either a braking event or an acceleration event. The electronic control unit predicts the triggering event based on the rate of depression of the brake pedal or the acceleration pedal and causes the vehicle to apply a second braking force or a second acceleration force.

20 Claims, 5 Drawing Sheets

(51) Int. Cl.
    *B60W 10/06*     (2006.01)
    *B60W 10/18*     (2012.01)
    *B60W 40/08*     (2012.01)

(56) References Cited

U.S. PATENT DOCUMENTS

| | | |
|---|---|---|
| 6,542,793 B2 | 4/2003 | Kojima et al. |
| 7,647,152 B2 | 1/2010 | Ogawa |
| 7,778,742 B2 | 8/2010 | Kuge et al. |
| 7,826,970 B2 | 11/2010 | Kobayashi et al. |
| 7,835,842 B2 | 11/2010 | Unterforsthuber |
| 8,340,882 B2 | 12/2012 | Kim |
| 8,532,900 B2 | 9/2013 | Maruyama et al. |
| 8,712,661 B2 | 4/2014 | Sakaguchi et al. |
| 2007/0012499 A1* | 1/2007 | Kobayashi ............... B60T 7/22 701/300 |
| 2007/0142987 A1 | 6/2007 | Takamatsu et al. |
| 2015/0094928 A1 | 4/2015 | Matsumura |
| 2015/0239450 A1 | 8/2015 | Yu et al. |
| 2015/0329098 A1* | 11/2015 | Abuelsaad ............ B60W 10/02 701/54 |
| 2016/0221437 A1 | 8/2016 | Takegawa et al. |
| 2016/0231130 A1* | 8/2016 | Akiyama ............. B60W 30/09 |

\* cited by examiner

LEARNING DRIVER RATE OF PEDAL CHANGE

BACKGROUND

1. Field

This specification relates to a system and a method for predicting the braking or acceleration of a vehicle.

2. Description of the Related Art

Drivers encounter many obstacles when navigating a vehicle to a destination. As a result, a driver may need to suddenly brake or accelerate to avoid the obstacles. That is, the driver may need to more forcefully depress the brake or the accelerator to stop or accelerate the vehicle. The obstacle may be unexpected, such as a ball that rolls into the street, or may be expected, such as a stop sign or an on-ramp. As the vehicle approaches an obstacle, the driver may be required to stop or accelerate. For example, if a ball rolls into the path of the vehicle, the driver may need to suddenly stop by fully engaging the brakes.

When a driver intends to suddenly stop or accelerate, the driver may rapidly depress the brake pedal or depress the accelerator pedal to stop or accelerate. However, there is a lag between when the driver depresses the brake pedal or the accelerator pedal and when the brakes or accelerator are fully engaged.

Accordingly, there is a need for a system and method for predicting the braking or acceleration of a vehicle to improve efficiency of the powertrain and reduce the response time associated with engaging the brakes or accelerator.

SUMMARY

In general, one aspect of the subject matter described in this specification is embodied in a pedal change prediction system for a vehicle. The pedal change prediction system includes at least one of a braking sensor connected to a braking pedal for providing braking data or an acceleration sensor connected to an acceleration pedal for providing acceleration data. The pedal change prediction system includes an electronic control unit connected to the at least one of the braking sensor or the acceleration sensor. The electronic control unit is configured to determine a rate of depression of the brake pedal or the acceleration pedal based on the braking data or the acceleration data. The rate of depression of the brake pedal or the acceleration pedal is associated with a first braking force or a first acceleration force. The electronic control unit is configured to predict a triggering event. The triggering event is either a braking event or an acceleration event. The electronic control unit predicts the triggering event based on the rate of depression of the brake pedal or the acceleration pedal and causes the vehicle to apply a second braking force or a second acceleration force based on the triggering event.

These and other embodiments may optionally include one or more of the following features. The electronic control unit may be configured to determine that the triggering event is a braking event when the rate of depression of the brake pedal is greater than or equal to a threshold braking rate and determine that the triggering event is an acceleration event when the rate of depression of the acceleration pedal is greater than or equal to a threshold acceleration rate.

The pedal change prediction system may include a sensor for detecting an identity of a driver of the vehicle and a memory for storing driver behavior patterns that include a learned rate of depression for the brake pedal and a learned rate of depression for the acceleration pedal. The threshold braking rate may be the learned rate of depression, and the threshold acceleration rate may be the learned rate of depression for the acceleration pedal.

The pedal change prediction system may include a navigation unit for providing navigational map information including terrain features or political features that indicate an acceleration event or a braking event. The electronic control unit may be configured to predict the triggering event further based on the navigational map information.

When the vehicle applies the second braking force or the second acceleration force, the second braking force or the second acceleration force may be greater than the first braking force or the first acceleration force, respectively. The electronic control unit may open the throttle valve of the engine to increase the amount or rate of air entering the engine to cause the second acceleration force. The amount or rate that the throttle valve of the engine may be opened based on the navigational map information.

In another aspect, the subject matter is embodied in a pedal change prediction system for a vehicle. The pedal change prediction system may include a braking sensor for providing braking data and an acceleration sensor for providing acceleration data. The electronic control unit may be connected to the at least one of the braking sensor or the acceleration sensor. The electronic control unit may be configured to determine a rate of depression of a brake pedal based on the braking data when the brake pedal is depressed. The electronic control unit may be configured to determine a rate of depression of an acceleration pedal based on the acceleration data when the acceleration pedal is depressed. The electronic control unit may be configured to predict a braking event based on the rate of depression of the brake pedal or an acceleration event based on the rate of depression of the acceleration pedal. The electronic control unit may be configured to cause the vehicle to brake or accelerate based on the braking event or the acceleration event.

In another aspect, the subject matter is embodied in a method for causing further acceleration or braking of a vehicle. The method may include determining, by an electronic control unit, a rate of depression of a brake pedal or an acceleration pedal. The method may include obtaining, from a memory, a learned rate of depression of the brake pedal or the acceleration pedal. The method may include determining, by the electronic control unit, that a braking event or an acceleration event is occurring based on the rate of depression of the brake pedal or the acceleration pedal and the learned rate of depression of the brake pedal or the acceleration pedal. The method may include causing, by the electronic control unit, the vehicle to brake or accelerate in response to determining that the braking event or the acceleration event is occurring.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for controlling the brakes and accelerator to predict a driver's intention to change the position of the brakes and accelerator. Particular embodiments of the subject matter described in this specification may be implemented to realize one or more of the following advantages. A pedal change prediction system operates the brakes and/or the accelerator to reduce the response time to fully engage the brakes or the accelerator. The pedal change prediction system predicts when the driver intends to press either the accelerator pedal or the brake pedal all the way down. In response, the pedal change prediction system preemptively causes the associated action, such as fully engaging the throttle or brake. This facilitates a quicker implementation of a driver's intention.

Other benefits and advantages include adjusting the associated action based on the surrounding environment. By recognizing the surrounding environment, the pedal change prediction system more accurately predicts when a driver intends to accelerate or brake. For example, the pedal change prediction system may identify that the vehicle is approaching an on-ramp and prepare the vehicle for an acceleration event. This improves fuel efficiency by preemptively engaging the throttle in anticipation of the driver fully accelerating the vehicle. Moreover, the pedal change prediction system may recognize that there is a hazard and adjust the response to prevent accidents and increase safety. For example, when a driver intends to fully engage the accelerator, the pedal change prediction system may manage the increase in acceleration to prevent the vehicle from running into the vehicle in front.

Additionally, the pedal change prediction system may tune the control of the accelerator or brakes to each individual driver to better predict when a particular driver intends to fully engage the brakes or the accelerator.

Figure 1:
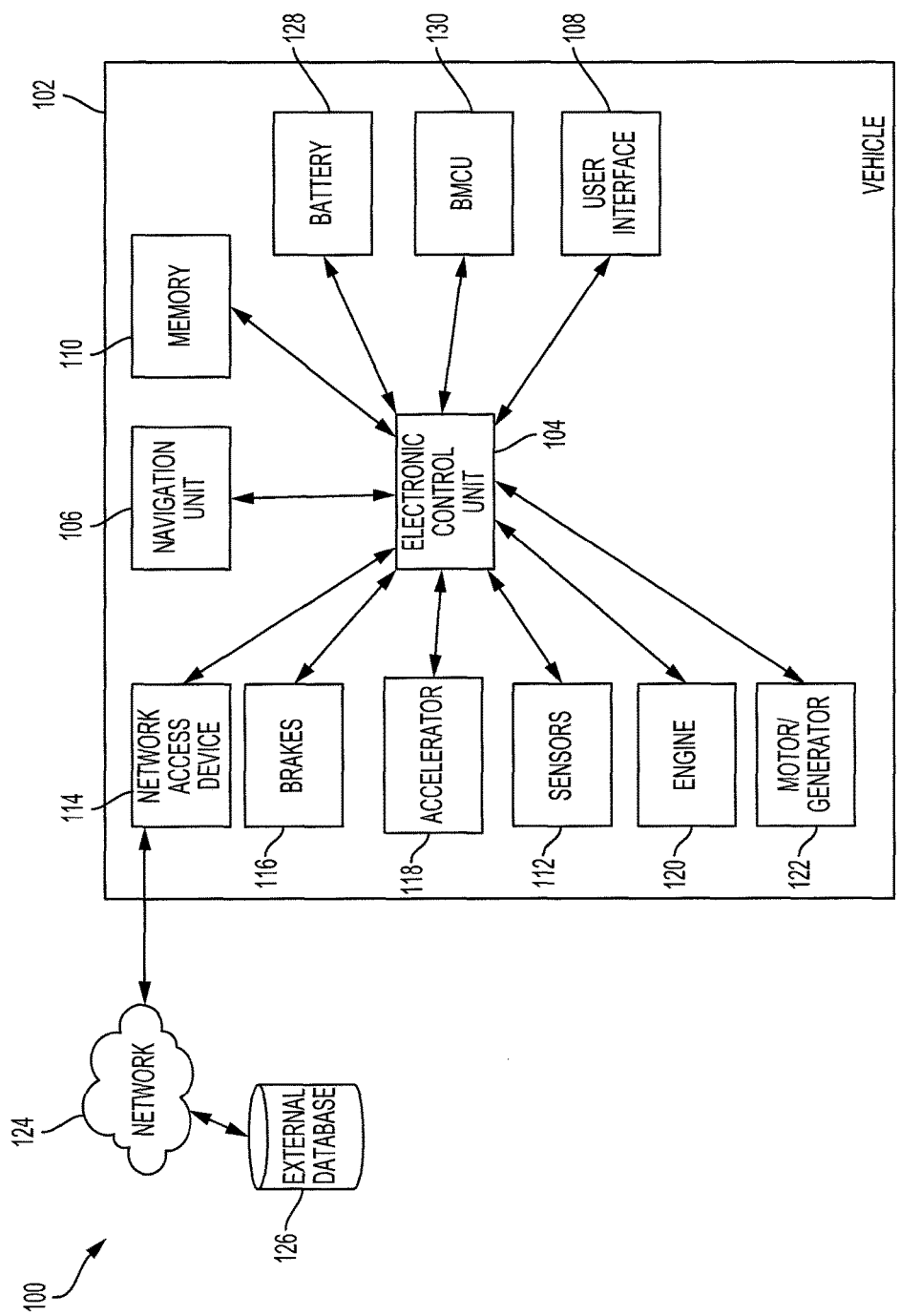
FIG. 1 is a block diagram of an example pedal change prediction system for a vehicle, according to an aspect of the invention.

FIG. 1 is a block diagram of an example pedal change prediction system 100 for a vehicle 102. The pedal change prediction system 100 includes one or more computers or electronic control units (ECUs) 104, appropriately programmed, to control coasting in the vehicle 102. The pedal change prediction system 100 may include one or more sensors 112, a navigation unit 106, a user interface 108, a memory 110, one or more external databases 126 connected through a network 124 and/or a network access device 114. The pedal change prediction system 100 may predict when a driver intends to fully engage the brakes 116 or accelerator 118 and apply a force to engage the brakes 116 or accelerator 118 of a vehicle 102. The brakes 116 may include the brake pedal, one or more cylinders and/or disc brakes. The accelerator 118 may include the accelerator pedal and/or throttle.

The pedal change prediction system 100 may be included in a vehicle 102 and connected to one or more external databases 126 through a network 124. A vehicle 102 is a conveyance capable of transporting a person, an object, or a permanently or temporarily affixed apparatus. A vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle or any other type of vehicle that includes a motor and/or generator 122. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may use one or more sensors 112 and/or the navigation unit 106 to drive autonomously.

The vehicle 102 may be coupled to a network 124. The network 124, such as a local area network (LAN), a wide area network (WAN), a cellular network, a digital short-range communication (DSRC), the Internet, or a combination thereof, connects the vehicle 102 and/or the pedal change prediction system 100 to the one or more external databases 126. The external databases 126 may include databases from different service providers. A service provider may provide navigational map, weather and/or traffic condition information to the vehicle 102.

A database is any collection of pieces of information that is organized for search and retrieval, such as by a computer, and the database may be organized in tables, schemas, queries, report, or any other data structures. A database may use any number of database management systems. An external database 126 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include a route that the vehicle 102 intends to travel. The route may include a starting location, a destination location and a path between the starting location and the destination location. The navigational map information may include terrain, political, traffic condition, roadway and/or construction information along the route. Political information includes political features such as cities, states, zoning ordinances, and laws and regulations, and traffic signs. Roadway information includes road features such the grade of an incline of a road and/or the boundaries of one or more lanes that make up the roadway. Construction information includes construction features such as construction zones and construction hazards. Traffic condition information includes one or more traffic condition features, such as a stop sign, traffic signal, traffic congested areas or accident areas. The traffic condition information may provide information related to the density and movement of vehicles on a roadway and/or accident locations. Traffic condition information may include real-time information of the traffic congested areas or accident areas. Terrain information may include terrain features, such as hills, flat terrains, or curves, and/or topographical information.

Features, e.g., terrain features, road features, political features, or traffic condition features, which may be derived from the terrain, roadway, political or traffic condition information, each have a location that may be identified by map coordinates. The map coordinates may be defined by latitude and longitudinal coordinates.

The vehicle 102 may include an engine 120, a motor and/or a generator 122, battery 128 and a battery management and control unit (BMCU) 130. The motor and/or the generator 122 may be an electric motor and an electric generator that converts electrical energy into mechanical power, such as torque, and converts mechanical power into electrical energy. The motor and/or the generator 122 may be coupled to the battery 128. The motor and/or the generator 122 may convert the energy from the battery 128 into mechanical power, and may provide energy back to the battery 128, for example, via regenerative braking. The engine 120 combusts fuel to provide power instead of and/or in addition to the power supplied by the motor and/or the generator 122. The vehicle 102 may include brakes 116 for slowing and/or stopping the vehicle 102 and an accelerator 118 to open a throttle valve of the engine 120 to cause the vehicle 102 to move.

The battery 128 may be coupled to the motor and/or the generator 122 and may provide electrical energy to and receive electrical energy from the motor and/or the generator 122. The battery 128 may include one or more rechargeable batteries.

The BMCU 130 may be coupled to the battery 128 and control and manage the charging and discharging of the battery 128. The BMCU 130, for example, may measure, using battery sensors (not shown), parameters used to determine the state of charge (SOC) of the battery 128.

The one or more ECUs 104 may be implemented as a single ECU or in multiple ECUs. The ECU 104 may be electrically coupled to some or all of the components of the vehicle 102. The ECU 104 may be coupled to at least one of the navigation unit 106, the one or more sensors 112, the network access device 114 and/or the memory 110. The ECU 104 may include one or more processors or controllers specifically designed for controlling the brakes 116 and/or the accelerator 118, such as opening the throttle valve of the engine 120 to cause the vehicle 102 to accelerate or injecting fluid into the cylinders to cause the vehicle 102 to brake.

The memory 110 may be coupled to the ECU 104. The memory 110 may store instructions to execute on the ECU 104 and may include one or more of a RAM or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 104. The memory 110 may store the location of braking events, the location of acceleration events and/or driver profiles that include driving behavior patterns of a driver. The driving behavior patterns of a driver may include braking data and/or acceleration data.

The network access device 114 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 114 may transmit data to and receive data from devices and systems not directly connected to the vehicle 102. For example, the ECU 104 may communicate with the external databases 126. Furthermore, the network access device 114 may access the network 124, to which the external databases 126 are also connected.

The one or more sensors 112 may be coupled to the ECU 104 and include a vehicle speed sensor, an acceleration input sensor, a brake sensor, and/or one or more proximity sensors. The vehicle speed sensor measures the speed of the vehicle 102, for example, by measuring the total revolutions of the wheel per minute. The brake sensor measures the position of the brake pedal, the amount the brake pedal is depressed and/or the rate of depression of the brake pedal. The acceleration input sensor measures the position of the accelerator pedal, the amount the accelerator pedal is depressed and/or rate of depression of the accelerator pedal. The one or more proximity sensors may be positioned on the front and/or rear of the vehicle 102 to detect surrounding vehicles and/or objects that are within a threshold distance in the front and/or back of the vehicle 102, respectively. The proximity sensor may use radar, a camera, vehicle-to-vehicle (V2V) communication or other means to detect and/or measure a distance to the other vehicles or objects. The one or more sensors 112 may include one or more cameras that may be used to identify a driver to determine a driver profile to be used as baseline for the driver behavior patterns.

The navigation unit 106 may be coupled to the ECU 104 and provide vehicle information and/or navigational map information to the ECU 104. The vehicle information may include the current location, direction and/or speed of the vehicle 102.

Figure 2:
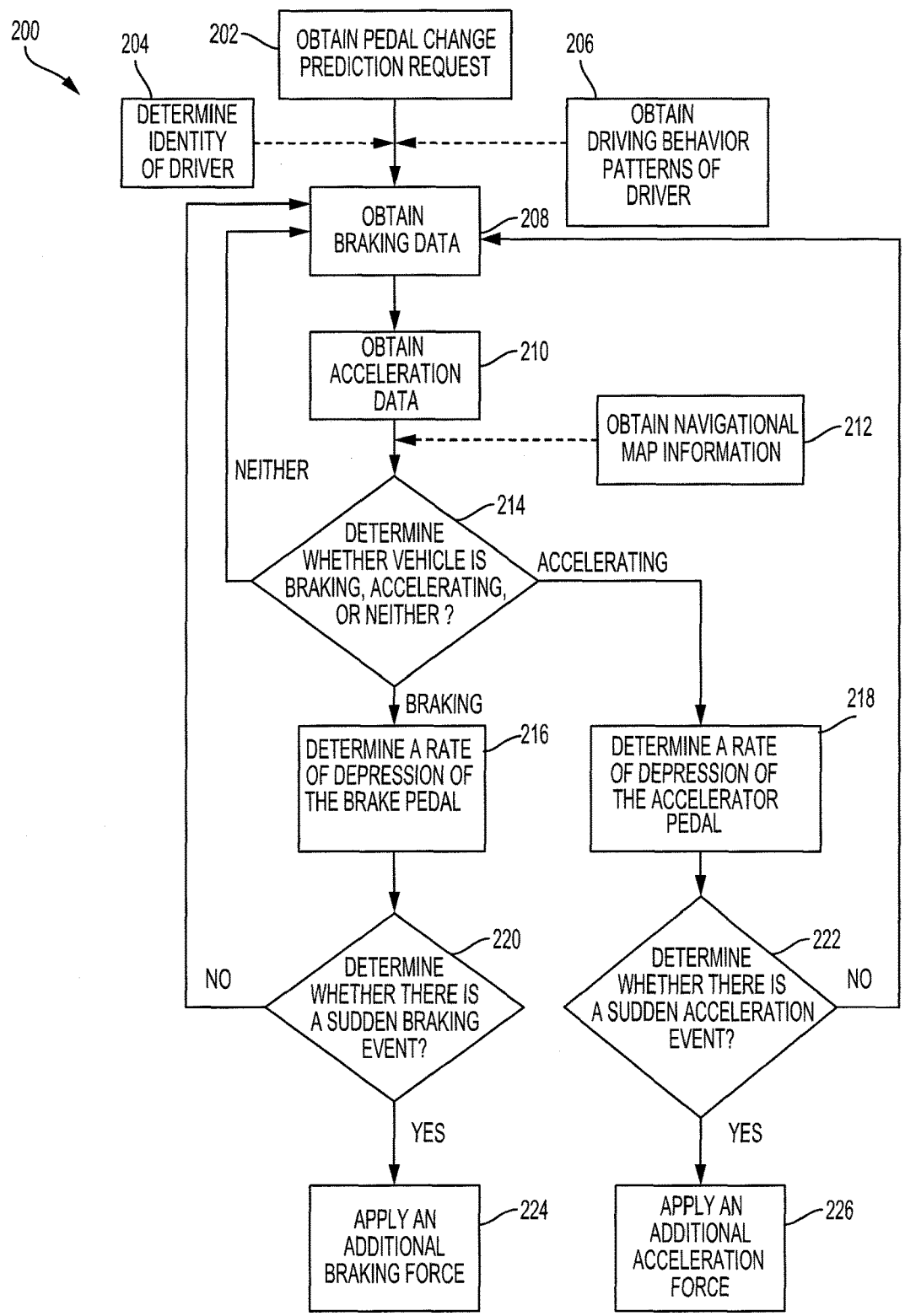
FIG. 2 is a flow diagram of an example process for predicting and controlling the braking or acceleration force applied to the brakes or accelerator, respectively, according to an aspect of the invention.

FIG. 2 is a flow diagram of an example process 200 for predicting and controlling the braking or acceleration force applied to the brakes 116 or the accelerator 118, respectively. One or more computers or one or more data processing apparatuses, for example, the ECU 104 of the pedal change prediction system 100 of FIG. 1, appropriately programmed, may implement the process 200.

The pedal change prediction system 100 obtains a pedal change prediction request (202). The pedal change prediction request is a request to initialize the pedal change prediction system 100. The pedal change prediction system 100 receives the pedal change prediction request when the vehicle 102 becomes operational or when an occupant of the vehicle 102 activates the pedal change prediction system 100, e.g., through a user interface 108.

The pedal change prediction system 100 may receive the pedal change prediction request from one or more sensors 112, such as an engine sensor, when the vehicle 102 is powered on. The pedal change prediction system 100 may receive the pedal change prediction request upon user activation, for example, when a token, such as a key, is inserted to start the vehicle 102. When the pedal change prediction system 100 is initialized, the pedal change prediction system 100 may display an indicator on the user interface 108 to indicate to the driver that the pedal change prediction system 100 is initialized.

The pedal change prediction system 100 may determine an identity of a driver during initialization (204). The pedal change prediction request may include the identity of the driver. The pedal change prediction system 100 may receive user input, such as a user identification token, a user id or a fingerprint, which identifies the driver, to determine the identity of the driver. For example, a driver's key fob may uniquely identify the driver when the driver opens the door or is within proximity of the vehicle 102. In another example, the pedal change prediction system 100 may obtain a user id from the driver, using the user interface 108, to identify the driver. The pedal change prediction system 100 may use other user interface elements, such as a memory button that configures the position of a mirror or a seat, other sensors, such as a camera that uses facial recognition, or a combination of devices and/or techniques to identify the driver of the vehicle 102. The identity of the driver may be associated with driver behavior patterns that were stored in the memory 110.

The pedal change prediction system 100 may obtain the driving behavior patterns of the driver (206). The memory 110 may have an internal database that associates the identity of the driver with previously stored driver behavior patterns. The ECU 104 may provide the identity of the driver to the internal database and receive the previously stored driver behavior patterns associated with the identity of the driver. The driver behavior patterns may include an average rate of depression for the braking pedal and/or an average rate of depression for the accelerator pedal for the identified driver. The previously stored driver behavior patterns may be recorded and stored on a previously-travelled route that the driver traversed using the vehicle 102. A statistical average of the rate of depression for the braking pedal and/or a statistical average of the rate of depression for the accelerator pedal may be stored and associated with the identified driver in the memory 110.

The pedal change prediction system 100 obtains braking data (208). The braking data includes a position of the brake pedal, a rate of depression of the brake pedal and/or an amount of depression of the brake pedal. The pedal change prediction system 100 may obtain the braking data using the one or more sensors 112. The one or more sensors 112 may include a brake sensor that measures and provides braking data including a position of the brake pedal of the brakes 116. The ECU 104 may obtain the position of the brake pedal over a period of time and calculate the change in the amount of pressure applied to or depression of the brake pedal of the brakes 116 over the period of time and/or the rate of depression of the brake pedal of the brakes 116.

The pedal change prediction system 100 obtains acceleration data (210). The acceleration data includes a position of the accelerator pedal, a rate of depression of the accelerator pedal and/or an amount of depression of the accelerator pedal. The pedal change prediction system 100 may obtain the accelerator data using the one or more sensors 112. The one or more sensors 112 may include an accelerator input sensor that measures the position of the accelerator pedal of the accelerator 118. The ECU 104 may obtain the position of the accelerator pedal over a period of time and calculate the change in the amount of pressure applied to or depression of the accelerator pedal of the accelerator 118 over the period of time and/or the rate of depression of the accelerator pedal of the accelerator 118.

The pedal change prediction system 100 may obtain navigational map information (212). The pedal change prediction system 100 may obtain the navigational map information from the one or more external databases 126 using the navigation unit 106. The navigational map information includes the political information, traffic condition information, terrain information, roadway and construction information. The navigation unit 106 and/or the ECU 104 may request navigational map information from the one or more external databases 126 through the network 124 and may receive a response with the navigational map information from the one or more external databases 126.

The pedal change prediction system 100 determines whether the vehicle is braking or accelerating (214). The pedal change prediction system 100 may determine whether the vehicle is braking or accelerating based on the braking data and/or the acceleration data. The braking data includes a position of the braking pedal which indicates when the braking pedal is depressed and the vehicle 102 is braking. The acceleration data includes a position of the acceleration pedal which indicates when the acceleration pedal is depressed and the vehicle 102 is accelerating. If the pedal change prediction system 100 determines that the vehicle is not braking and not accelerating, the pedal change prediction system 100 continues to monitor the braking sensor and the acceleration input sensor for an indication that the driver is braking or accelerating.

If the vehicle 102 is braking, the pedal change prediction system 100 determines a rate of depression of the brake pedal (216). The rate of depression of the brake pedal exerts a current braking force on the vehicle 102. The pedal change prediction system 100 determines a rate of depression of the brake pedal based on the braking data. The ECU 104 may calculate the rate of depression of the braking pedal based on the amount of depression of the braking pedal over a period of time. That is, the change in the amount that the brake pedal is depressed or the change in the position of the brake pedal divided by a period of time.

If the vehicle 102 is accelerating, the pedal change prediction system 100 determines a rate of depression of the acceleration pedal (218). The rate of depression of the acceleration pedal exerts a current acceleration force that propels the vehicle 102. The pedal change prediction system 100 determines a rate of depression of the acceleration pedal based on the acceleration data. The ECU may calculate the rate of depression of the acceleration pedal based on the amount of depression of the braking pedal over a period of time. That is, the change in the amount that the accelerator pedal is depressed or the change in the position of the accelerator pedal divided by a period of time.

The pedal change prediction system 100 determines whether there is a triggering event. The triggering event may be either a sudden braking event or a sudden acceleration event. In response to determining that the vehicle 102 is braking, the pedal change prediction system 100 determines whether there is a sudden braking event (220). A sudden braking event is an event where the driver is suddenly stopping a vehicle 102, e.g., to avoid running a red light or hitting a vehicle in front. The driver is suddenly stopping the vehicle 102 when the rate of depression of the brake pedal is greater than or equal to a threshold braking rate. The threshold braking rate may be a braking rate that is a standard deviation greater than an average or median rate of depression of the brake pedal for the driver. In some implementations, the threshold braking rate is the average or median rate of depression of the brake pedal.

In response to determining that the vehicle 102 is accelerating, the pedal change prediction system 100 determines whether there is a sudden acceleration event (222). A sudden acceleration event is an event where the driver is suddenly accelerating the vehicle 102, e.g., to drive an incline or accelerate on an on-ramp to merge into highway traffic. The driver is suddenly accelerating the vehicle 102 when the rate of the depression of the acceleration pedal is greater than or equal to a threshold acceleration rate. The threshold acceleration rate may be an acceleration rate that is a standard deviation greater than an average or median rate of depression of the acceleration pedal for the driver. In some implementations, the threshold acceleration rate is the average or median rate of depression of the acceleration pedal. The threshold braking rate and the threshold acceleration rate may be customizable by the driver or set to a range of values less than the average rates, such as 60%-80% of the average rate.

Figure 3:
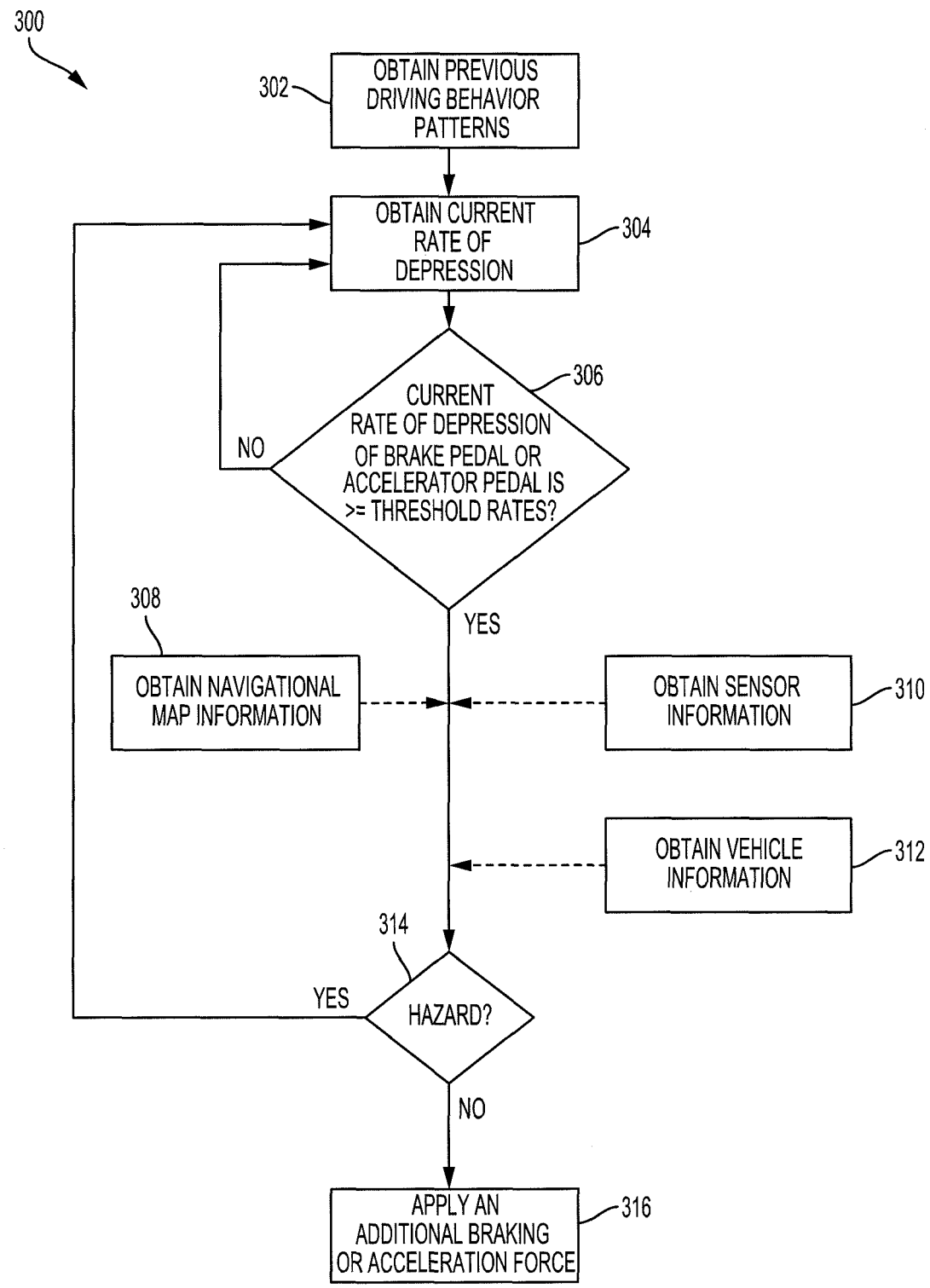
FIG. 3 is a flow diagram of an example process for determining that there is a braking event or an acceleration event, according to an aspect of the invention.

In some implementations, the triggering event is based on features extracted from the navigational map information. For example, an acceleration event may occur at the start location of an on-ramp or a braking event may occur at a stop sign. FIG. 3 further describes the process for determining whether there is a triggering event.

The pedal change prediction system 100 applies an additional braking force if there is a sudden braking event (224) or applies an additional acceleration force if there is a sudden acceleration event (226). The additional braking force or acceleration force is in addition to the current braking force or acceleration force resulting in an applied braking force or acceleration force that is greater than the current braking force or acceleration force, respectively. The pedal change prediction system 100 applies the additional braking force or additional acceleration force automatically so that the driver is not required to depress the braking pedal or acceleration pedal further. In some implementations, the additional applied force fully engages the brakes 116 or accelerator 118. Automatically engaging the brakes 116 or accelerator 118 reduces the response time for stopping or accelerating.

The pedal change prediction system 100 may apply the additional braking force by further depressing the brake pedal, by pushing a piston into the cylinders to inject additional fluid into the cylinders or by further pressing the brake pad against the disc brakes. In some implementations, the applied braking force fully engages the brakes 116. The amount of the applied braking force may be based on driver behavior patterns of the driver and controlled by the amount that the braking pedal is further depressed, the amount the piston is pushed into the cylinders or the amount that the brake pads are pressed against the brake disc. The amount of the applied braking force or acceleration force may range from 75%-100% or may be customizable by the driver.

The pedal change prediction system 100 may apply the additional acceleration force by further depressing the acceleration pedal, opening up the throttle valve of the engine 120 and/or providing additional electrical energy using the battery 128 and BMCU 130 to the motor and/or generator 122. In some implementations, the applied acceleration force fully engages the accelerator 118. The amount of the applied acceleration force may be based on driving behavior patterns of the driver and controlled by the amount that the throttle valve is opened, the amount that the acceleration pedal is further depressed or the amount of additional electrical energy that is provided. This prepares the vehicle 102 for acceleration and provides a more gradual acceleration.

In some implementations, the pedal change prediction system 100 may display or output an indicator on the user interface 108 to indicate to the driver when an additional acceleration or braking force is being applied. The indicator may be a visual and/or audio cue.

FIG. 3 is a flow diagram of an example process 300 for determining that there is a braking event or an acceleration event. One or more computers or one or more data processing apparatuses, for example, the ECU 104 of the pedal change prediction system 100 of FIG. 1, appropriately programmed, may implement the process 300.

Figure 4:
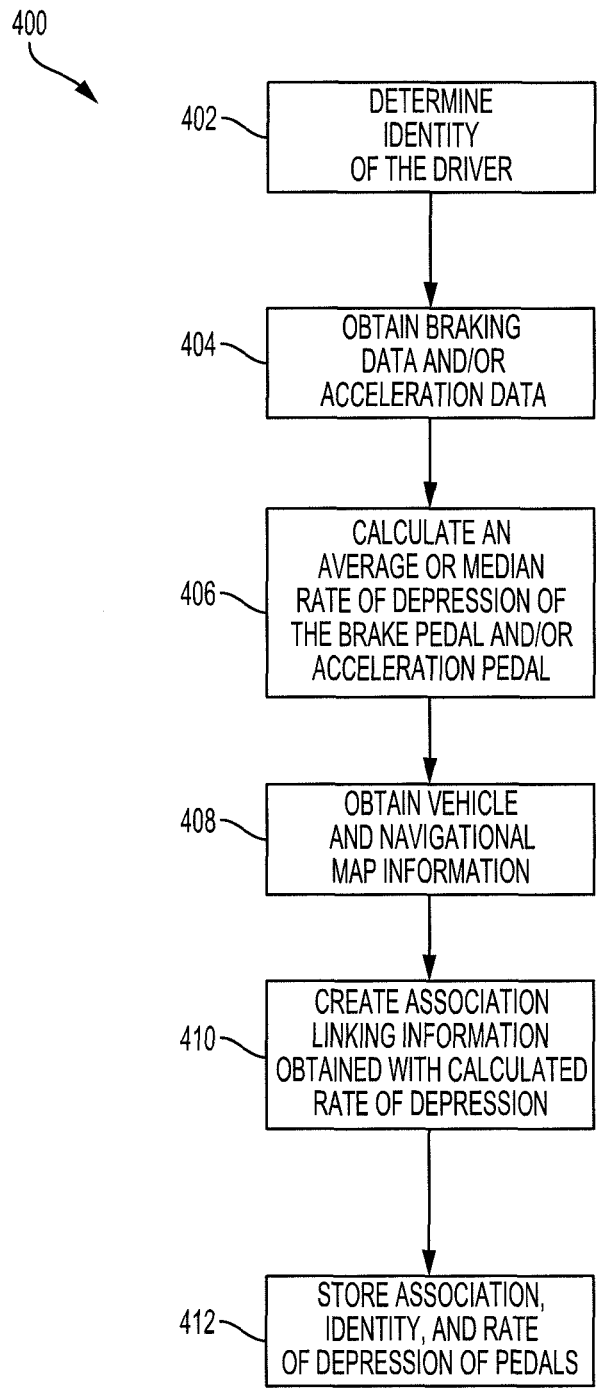
FIG. 4 is a flow diagram of an example process for storing driving behavior patterns for a driver on a previously-travelled route, according to an aspect of the invention.

The pedal change prediction system 100 obtains driving behavior patterns of the driver for a previously-travelled route (302). The pedal change prediction system 100 may have stored the driving behavior patterns previously in the memory 110. FIG. 4 further describes storing driving behavior patterns for a driver on a previously-travelled route. The pedal change prediction system 100 may obtain the driving behavior patterns from the memory 110. The driving behavior patterns may include an average or median rate of depression of the brake pedal and/or an average or median rate of depression of the acceleration pedal for the driver on the previously-travelled route.

The pedal change prediction system 100 obtains a current rate of depression of the brake pedal and/or the acceleration pedal (304). The pedal change prediction system 100 may detect or determine the current rate of depression of the brake pedal using braking data from the brake sensor and/or the current rate of depression of the acceleration pedal using acceleration data from the acceleration input sensor. The current rate of depression for either pedal may be calculated by the ECU 104 by measuring the position of the pedals over a period of time and calculating the rate from the measured amount.

The pedal change prediction system 100 compares the current rate of depression of the brake pedal to a threshold braking rate and/or compares the current rate of depression of the acceleration pedal to a threshold acceleration rate (306). The threshold braking rate may be the average or median rate of depression of the brake pedal obtained from a previously-travelled route associated with the driver or a standard deviation away from the average or median rate. The threshold acceleration rate may be the average or median rate of depression of the acceleration pedal obtained from the previously-travelled route associated with the driver or a standard deviation away from the average or median rate. If the pedal change prediction system 100 determines that neither the current rate of depression of the brake pedal nor the current rate of depression of the acceleration pedal is greater than or equal to the threshold braking rate or threshold acceleration rate, respectively, the pedal change prediction system 100 continues to monitor the current rate of depression of the brake pedal and acceleration pedal. If either the rate of depression of the brake pedal or the acceleration pedal is greater than or equal to the threshold braking rate or threshold acceleration rate, respectively, the pedal change prediction system 100 proceeds with detecting any hazards.

The pedal change prediction system 100 may obtain navigational map information (308), sensor information (310), and/or vehicle information (312) to determine whether to apply an additional braking or acceleration force. The pedal change prediction system 100 may obtain a combination of the navigational map information, sensor information and/or vehicle information. For example, the pedal change prediction system 100 may use a camera or proximity sensor to detect that there is traffic in front of or behind the vehicle 102 or that there is a posted speed limit. In another example, the pedal change prediction system 100 may extract the traffic condition information from the navigational map information downloaded from an external database 126.

The pedal change prediction system 100 may determine if there are one or more hazards in the path of the vehicle 102 based on at least one of the vehicle information, navigational map information or sensor information (314). The pedal change prediction system 100 may extract a current location of the vehicle 102 included in the vehicle information or navigational map information and compare that to the location of features, such as speed limit zones, traffic, etc. included in the navigational map information. If the location of the feature is within a threshold distance of the location of the vehicle and application of the additional braking or acceleration force further decreases the distance between the feature and the vehicle, the pedal change prediction system 100 may determine that there is a hazard.

For example, if a driver is depressing the brake pedal such that the current rate of depression is greater than or equal to the threshold braking rate and the distance between the vehicle following behind the vehicle 102 is less than the threshold distance, the pedal change prediction system 100 may determine that fully engaging the brakes 116 automatically would present a hazard. In another example, if there is traffic within a threshold distance of the vehicle 102 and the driver depresses the accelerator pedal such that the current rate of depression is greater than or equal to the threshold acceleration rate, the pedal change prediction system 100 may determine that fully engaging the accelerator 118 automatically would present a hazard because of the traffic.

The pedal change prediction system 100 may detect other terrain, traffic condition, roadway and/or political features using the one or more sensors 112 and/or retrieve the other features from the external database 126. For example, a roadway sensor may detect that the pavement of the roadway is wet or icy due to precipitation so if the driver depresses the accelerator pedal or the brake pedal at a rate greater than or equal to the threshold rates, the pedal change prediction system 100 may determine that the road conditions present a hazard. In another example, the pedal change prediction system 100 may use a vehicle speed sensor to detect the speed of the vehicle 102 and extract the speed limit of the roadway being travelled from the navigational map information. The pedal change prediction system 100 may determine that there is a hazard if increasing the acceleration of the vehicle 102 would cause the vehicle 102 to exceed the speed limit.

The pedal change prediction system 100 may apply an additional braking force when the current rate of depression of the brake pedal is greater than the threshold braking rate or an additional acceleration force when the current rate of depression of the accelerator pedal is greater than or equal to the threshold acceleration rate (316). In some implementations, the pedal change prediction system 100 may apply the additional braking force or acceleration force based on at least one of the hazard information, the navigational map information, the sensor information or the vehicle information. If the pedal change prediction system 100 detects a hazard, the pedal change prediction system 100 may not automatically apply the additional braking force or acceleration force, but instead continue to monitor for another occurrence of a depression of the brake pedal or the acceleration pedal. The pedal change prediction system 100, however, may not preclude normal operation and control of the vehicle 102 by the driver so the driver may override the actions of the pedal change prediction system 100.

FIG. 4 is a flow diagram of an example process 400 for storing driving behavior patterns for a driver on a previously-travelled route. One or more computers or one or more data processing apparatuses, for example, the ECU 104 of the pedal change prediction system 100 of FIG. 1, appropriately programmed, may implement the process 400.

The pedal change prediction system 100 determines an identity of the driver of the vehicle 102 (402). The pedal change prediction system 100 may determine the identity of the driver, as described above.

The pedal change prediction system 100 obtains braking data and acceleration data from the one or more sensors, as discussed above, for a route (404). The pedal change prediction system 100 measures change in position of the brake pedal and/or acceleration pedal, the amount and/or rate of depression of the brake pedal and/or acceleration pedal over a period of time. The period of time may extend across the duration of one or more routes travelled by the driver in the vehicle 102.

The pedal change prediction system 100 may calculate an average or median rate of depression of the brake pedal and/or acceleration pedal for the driver based on the change in position of the brake pedal and/or acceleration pedal, respectively, and the length of the period of time (406). The pedal change prediction system 100 may also calculate a rate that is a standard deviation from the average or median rate of depression of the brake pedal and/or acceleration pedal. The period of time may be measured by an internal clock of the vehicle 102 or via obtained vehicle and/or navigational map information. In some implementations, the pedal change prediction system 100 may continually and regularly update the average or median rate of depressing with the current braking data and/or acceleration data while travelling a route.

The pedal change prediction system 100 may obtain vehicle information and navigational map information associated with the vehicle 102 when the brake pedal and/or the acceleration pedal is depressed (408). The vehicle information and/or navigational map information may be obtained using the navigation unit 106 or sensors 112.

The pedal change prediction system 100 creates an association between at least one of the identity of the driver, the navigational map information or the vehicle information with the calculated average or median rate of depression of the brake pedal and/or acceleration pedal (410). For example, an index that references "Jane Doe" at "the intersection of Irvine Blvd. and Modjeska" applying an "average rate of depression of the accelerator pedal of 3 mm/s" may be created. Other information may be associated including a time of day or roadway features such as the incline of the roadway that affect the driving behavior patterns of a driver.

The pedal change prediction system 100 stores the association along with the each element of the association, such as the vehicle information, navigational map information and/or identity of the driver with the average or median rate of depression of the brake pedal and/or acceleration pedal in the memory 110 (412). The stored average or median rate of depression of the brake pedal and/or acceleration pedal may be referred to as the learned rate of depression of the brake pedal and/or acceleration pedal.

Figure 5B:
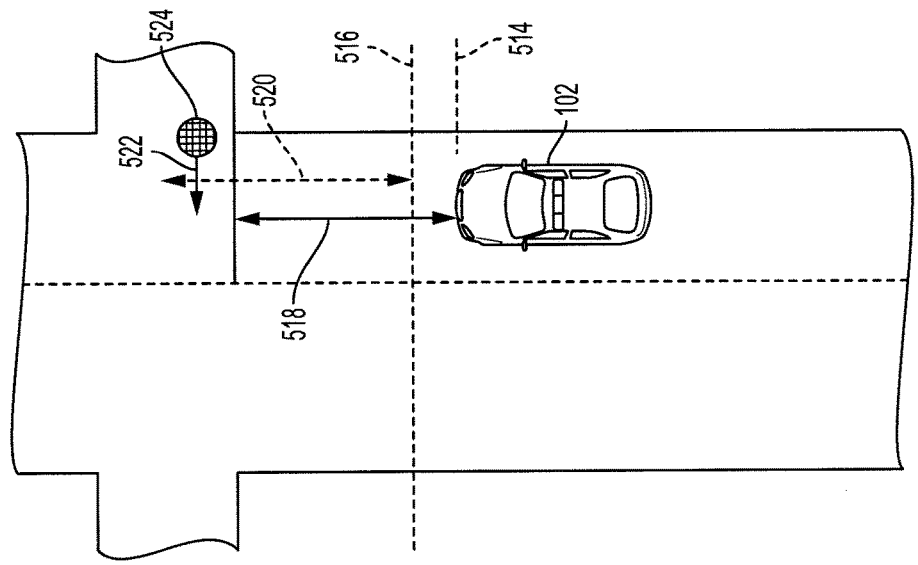
FIGS. 5A-5B show example illustrations of use cases of when the pedal change prediction system of FIG. 1 may be used to provide an additional acceleration force or an additional braking force, according to an aspect of the invention.
Figure 5A:
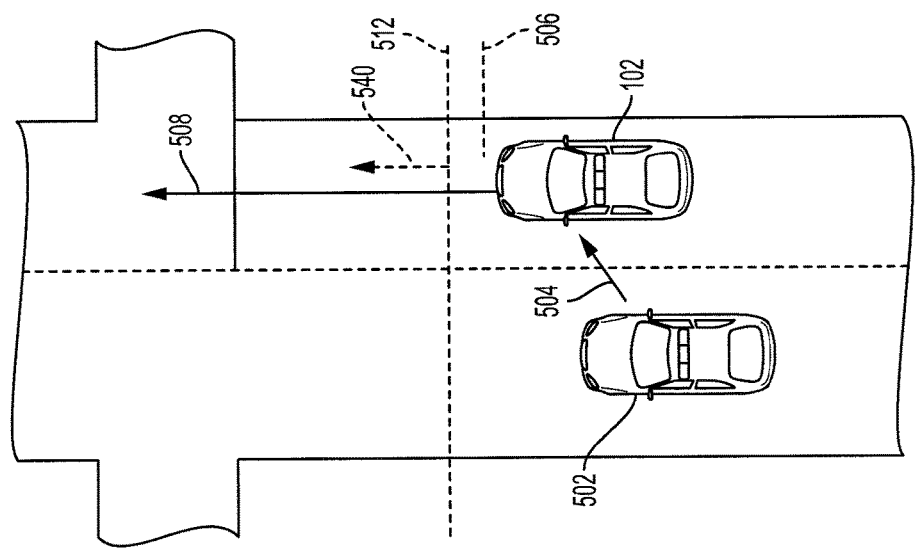

FIGS. 5A-5B show example illustrations of use cases of when the pedal change prediction system 100 of FIG. 1 may be used to provide an additional acceleration force or an additional braking force. FIG. 5A shows a vehicle 102 accelerating to avoid another vehicle 502 that is merging into the same lane as vehicle 102. The pedal change prediction system 100 may be installed in vehicle 102. The driver of vehicle 102 may see the vehicle 502 attempting to merge into the same lane along the direction 504. The driver of vehicle 102 may begin acceleration at point 506 to avoid an accident with the vehicle 502. The pedal change prediction system 100 may determine that the rate of depression of the accelerator pedal for vehicle 102 is greater than or equal to the threshold acceleration rate at point 512. The pedal change prediction system 100 provides an additional acceleration force 508 automatically so that the vehicle 502 does not collide with vehicle 102. The additional acceleration force 508 increases the responsiveness of the vehicle 102 and decreases the acceleration response time. Otherwise, without the additional acceleration force 508, the vehicle 102 responds solely to the depression of the accelerator pedal which results in the vehicle travelling with an acceleration force 510 that may not provide sufficient room for the vehicle 502 to merge.

FIG. 5B shows a vehicle 102 braking to avoid the ball 524 that is rolling in the roadway. The driver of the vehicle 102 may see the ball 524 rolling in the direction 522 and may engage the brakes 116 at point 514. The pedal change prediction system 100 may determine that the rate of depression of the brake pedal is greater than or equal to the threshold braking rate at point 516. In response, the pedal change prediction system 100 may apply the additional braking force, automatically, so that the vehicle 102 stops after a distance 518 to avoid hitting the ball 524. Otherwise, the vehicle 102 may respond solely to the depression of the brake pedal by the driver resulting in the vehicle 102 braking after travelling the distance 520 resulting in the collision with the ball 524.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A pedal change prediction system for a vehicle, comprising:
    at least one of a braking sensor coupled to a brake pedal for providing braking data or an acceleration sensor coupled to an acceleration pedal for providing acceleration data; and
    an electronic control unit coupled to the at least one of the braking sensor or the acceleration sensor and configured to:
        determine a rate of depression of the brake pedal that applies a current braking force based on the braking data or the acceleration pedal that applies a current acceleration force based on the acceleration data,
        predict a triggering event that is a braking event or an acceleration event based on the rate of depression of the brake pedal or the acceleration pedal, and
        automatically apply an additional braking force when the triggering event is the braking event and an additional acceleration force when the triggering event is the acceleration event.

2. The pedal change prediction system of claim 1, wherein to predict the triggering event that is the braking event or the acceleration event based on the rate of depression of the brake pedal or the acceleration pedal, the electronic control unit is configured to:
    determine that the triggering event is the braking event when the rate of depression of the brake pedal is greater than or equal to a threshold braking rate; and
    determine that the triggering event is the acceleration event when the rate of depression of the acceleration pedal is greater than or equal to a threshold acceleration rate.

3. The pedal change prediction system of claim 2, further comprising:
    a sensor for detecting an identity of a driver of the vehicle; and
    a memory for storing driving behavior patterns of the driver including a learned rate of depression for the brake pedal and a learned rate of depression for the acceleration pedal,
    wherein the threshold braking rate is the learned rate of depression for the brake pedal and the threshold acceleration rate is the learned rate of depression for the acceleration pedal, wherein the learned rate of depression for the brake pedal and the learned rate of depression for the acceleration pedal are obtained during travel of a previously-travelled route.

4. The pedal change prediction system of claim 1, further comprising:
    a navigation unit for providing navigational map information including terrain features or political features that indicate the acceleration event or the braking event,
    wherein the electronic control unit is configured to predict the triggering event further based on the navigational map information obtained from the navigation unit.

5. The pedal change prediction system of claim 1, further comprising:
    one or more sensors for detecting sensor information including at least one of an incline of a roadway, weather or traffic,
    wherein the electronic control unit is configured to predict the triggering event further based on the sensor information.

6. The pedal change prediction system of claim 1, wherein the additional braking force is greater than the current braking force and the additional acceleration force is greater than the current acceleration force.

7. The pedal change prediction system of claim 1, wherein to automatically apply the additional acceleration force, the electronic control unit is configured to open a throttle valve of an engine of the vehicle to increase an amount or rate of air entering the engine, wherein an amount or rate that the throttle valve of the engine is opened is based on driver behavior patterns.

8. The pedal change prediction system of claim 1, further comprising:
    a battery management and control unit (BMCU) configured to control and manage charging and discharging of a battery of the vehicle;
    wherein to automatically apply the additional acceleration force the electronic control unit is configured to cause the BMCU to discharge additional electrical energy to power or move the vehicle.

9. A pedal change prediction system for a vehicle, comprising:
    a braking sensor for providing braking data;
    an acceleration sensor for providing acceleration data; and
    an electronic control unit coupled to at least one of the braking sensor or the acceleration sensor and configured to:
        determine a rate of depression of a brake pedal that applies a current braking force based on the braking data when the brake pedal is depressed,
        determine a rate of depression of an acceleration pedal that applies a current acceleration force based on the acceleration data when the acceleration pedal is depressed,
        predict a braking event based on the rate of depression of the brake pedal or an acceleration event based on the rate of depression of the acceleration pedal, and
        apply an additional braking force when the braking event is predicted and an additional acceleration force when the acceleration event is predicted.

10. The pedal change prediction system of claim 9, further comprising:
  a navigational unit for obtaining navigational map information;
  wherein the electronic control unit is configured to:
    obtain the navigational map information, and
    predict the braking event or the acceleration event further based on the navigational map information.

11. The pedal change prediction system of claim 9, further comprising:
  a camera for capturing an image of a driver of the vehicle;
  wherein the electronic control unit is configured to:
  obtain the image of the driver of the vehicle, and
  determine an identity of the driver of the vehicle.

12. The pedal change prediction system of claim 11, wherein the electronic control unit is configured to predict the braking event or the acceleration event further based on a learned rate of depression of the acceleration pedal or a learned rate of depression of the brake pedal, wherein the learned rate of depression of the acceleration pedal and the learned rate of depression of the brake pedal is based on the identity of the driver.

13. A method for causing further acceleration or braking of a vehicle, comprising:
  determining, by an electronic control unit, a rate of depression of a brake pedal or an acceleration pedal;
  obtaining, from memory, a learned rate of depression of the brake pedal or the acceleration pedal, the learned rate of depression of the brake pedal or the acceleration pedal being measured during travel of a previously-travelled route;
  determining, by the electronic control unit, that a braking event or an acceleration event is occurring based on the rate of depression of the brake pedal or the acceleration pedal and the learned rate of depression of the brake pedal or the acceleration pedal; and
  causing, by the electronic control unit, the vehicle to brake or accelerate in response to determining that the braking event or the acceleration event is occurring.

14. The method of claim 13, further comprising:
  obtaining, by the electronic control unit, navigational map information and vehicle information,
  wherein determining that the braking event or the acceleration event is occurring is further based on the navigational map information and the vehicle information.

15. The method of claim 14, further comprising a sensor for providing sensor information including road condition information or traffic condition information, wherein causing the vehicle to brake or accelerate is based on the sensor information.

16. The method of claim 13, further comprising:
  detecting, by a braking sensor, an amount of braking by a driver on the previously-travelled route;
  detecting by an acceleration pedal sensor, an amount of acceleration by the driver on the previously-travelled route;
  determining, by the electronic control unit, the learned rate of depression for the brake pedal based on the amount of braking by the driver on the previously-travelled route; and
  determining, by the electronic control unit, the learned rate of depression for the accelerator pedal based on the amount of acceleration by the driver on the previously-travelled route.

17. The method of claim 16, further comprising:
  associating, by the electronic control unit, the learned rate of depression for the brake pedal and the learned rate of depression for the accelerator pedal with the driver; and
  storing, in the memory, the learned rate of depression for the brake pedal, the learned rate of depression for the accelerator pedal and the association with the driver.

18. The method of claim 13, wherein determining, by the electronic control unit, that the braking event or the acceleration event is occurring includes determining that the rate of depression of the brake pedal or the acceleration pedal is greater than or equal to the learned rate of depression of the brake pedal or the acceleration pedal, respectively.

19. The method of claim 13, wherein causing, by the electronic control unit, the vehicle to brake or accelerate in response to determining that the braking event or the acceleration event is occurring includes causing the vehicle to brake when the rate of depression of the brake pedal is greater than or equal to the learned rate of depression for the brake pedal.

20. The method of claim 13, wherein causing, by the electronic control unit, the vehicle to brake or accelerate in response to determining that the braking event or the acceleration event is occurring includes causing the vehicle to accelerate when the rate of depression of the acceleration pedal is greater than or equal to the learned rate of depression for the acceleration pedal.

* * * * *